US012697898B2

(12) United States Patent
Lu et al.

(10) Patent No.: US 12,697,898 B2
(45) Date of Patent: *Aug. 4, 2026

(54) METHOD AND SYSTEM FOR CONTROLLING BATTERY SWAPPING OF VEHICLE, AND VEHICLE

(71) Applicant: BYD COMPANY LIMITED, Shenzhen (CN)

(72) Inventors: Hao Lu, Shenzhen (CN); Zhicheng Tan, Shenzhen (CN); Hongtao She, Shenzhen (CN); Mingyang Guo, Shenzhen (CN); Kangxian Pan, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 229 days.

This patent is subject to a terminal disclaimer.

(21) Appl. No.: 18/535,919

(22) Filed: Dec. 11, 2023

(65) Prior Publication Data

US 2024/0109456 A1     Apr. 4, 2024

Related U.S. Application Data

(63) Continuation of application No. PCT/CN2022/103848, filed on Jul. 5, 2022.

(30) Foreign Application Priority Data

Sep. 30, 2021     (CN) ......................... 202111167749.1

(51) Int. Cl.
*G07C 5/00*          (2006.01)
*B60L 53/22*         (2019.01)
           (Continued)

(52) U.S. Cl.
CPC .............. *B60L 53/80* (2019.02); *B60L 53/22* (2019.02); *B60L 53/62* (2019.02); *B60L 2210/12* (2013.01); *B60L 2210/14* (2013.01)

(58) Field of Classification Search
CPC .......... B60L 53/80; B60L 53/22; B60L 53/62; B60L 2210/12; B60L 2210/14; B60L 58/19
See application file for complete search history.

(56) References Cited

U.S. PATENT DOCUMENTS 10,807,493 B1 * 10/2020 Reeves ..................... B60L 3/12
2008/0068870 A1 * 3/2008 Eguchi .................. H02M 3/156
                                                      363/37
(Continued)

FOREIGN PATENT DOCUMENTS

CN          107054093 A     8/2017
CN          110015140 A     7/2019
               (Continued)

OTHER PUBLICATIONS

International Search Report and Written Opinion for Application No. PCT/CN2022/103848, mailed on Sep. 14, 2022, 9 pages.

*Primary Examiner* — Kito R Robinson
*Assistant Examiner* — Anthony Gabriel Mora
(74) *Attorney, Agent, or Firm* — Sheppard Mullin Richter & Hampton LLP

(57)          ABSTRACT

A method for controlling battery swapping of a vehicle is provided. The vehicle induces a vehicle control unit (VCU), a bidirectional DC-DC converter assembly, a vehicle load, a battery controller, a power battery pack, and a storage battery. The method includes: receiving, by the VCU, a battery swapping instruction when the vehicle is in the high-voltage power-on state; transmitting, by the VCU, a switching instruction to the bidirectional DC-DC converter assembly in response to the battery swapping instruction; and disabling, by the bidirectional DC-DC converter assembly, the buck mode in response to the switching instruction to cut off electrical connection between the power battery pack and a high-voltage circuit of the vehicle by a battery controller, and enabling the boost mode in response to the switching instruction to supply power to the vehicle load by the storage battery through the bidirectional DC-DC converter assembly.

15 Claims, 6 Drawing Sheets

(51) Int. Cl.

| | |
|---|---|
| *B60L 53/62* | (2019.01) |
| *B60L 53/80* | (2019.01) |
| *G07C 5/02* | (2006.01) |
| *G07C 5/04* | (2006.01) |
| *G07C 5/08* | (2006.01) |

(56)                References Cited

U.S. PATENT DOCUMENTS

| | | | | |
|---|---|---|---|---|
| 2016/0159250 A1* | 6/2016 | Meng | ................... | B60M 3/06 |
| | | | | 191/2 |
| 2020/0328478 A1* | 10/2020 | Nozawa | ............... | B60L 3/0046 |
| 2020/0366205 A1* | 11/2020 | Alves | ................. | H02M 3/1582 |
| 2020/0381928 A1* | 12/2020 | Isaksson | ................ | B60L 50/66 |

| | | | | |
|---|---|---|---|---|
| 2022/0136475 A1* | 5/2022 | Gopalakrishnan | ........................... | F02N 11/0866 |
| | | | | 123/179.1 |
| 2022/0402390 A1* | 12/2022 | Smolenaers | ............ | B60L 53/22 |
| 2024/0266844 A1* | 8/2024 | Yu | ........................... | H02J 7/575 |

FOREIGN PATENT DOCUMENTS

| | | | |
|---|---|---|---|
| CN | 111332123 A | 6/2020 |
| CN | 211089207 U | 7/2020 |
| CN | 112455231 A | 3/2021 |
| CN | 112874376 A | 6/2021 |
| CN | 113002328 A | 6/2021 |
| CN | 213637193 U | 7/2021 |
| JP | 2011041425 A | 2/2011 |
| JP | 2017229132 A | 12/2017 |
| KR | 20200136600 A | 12/2020 |
| WO | 2009024122 A2 | 2/2009 |

* cited by examiner

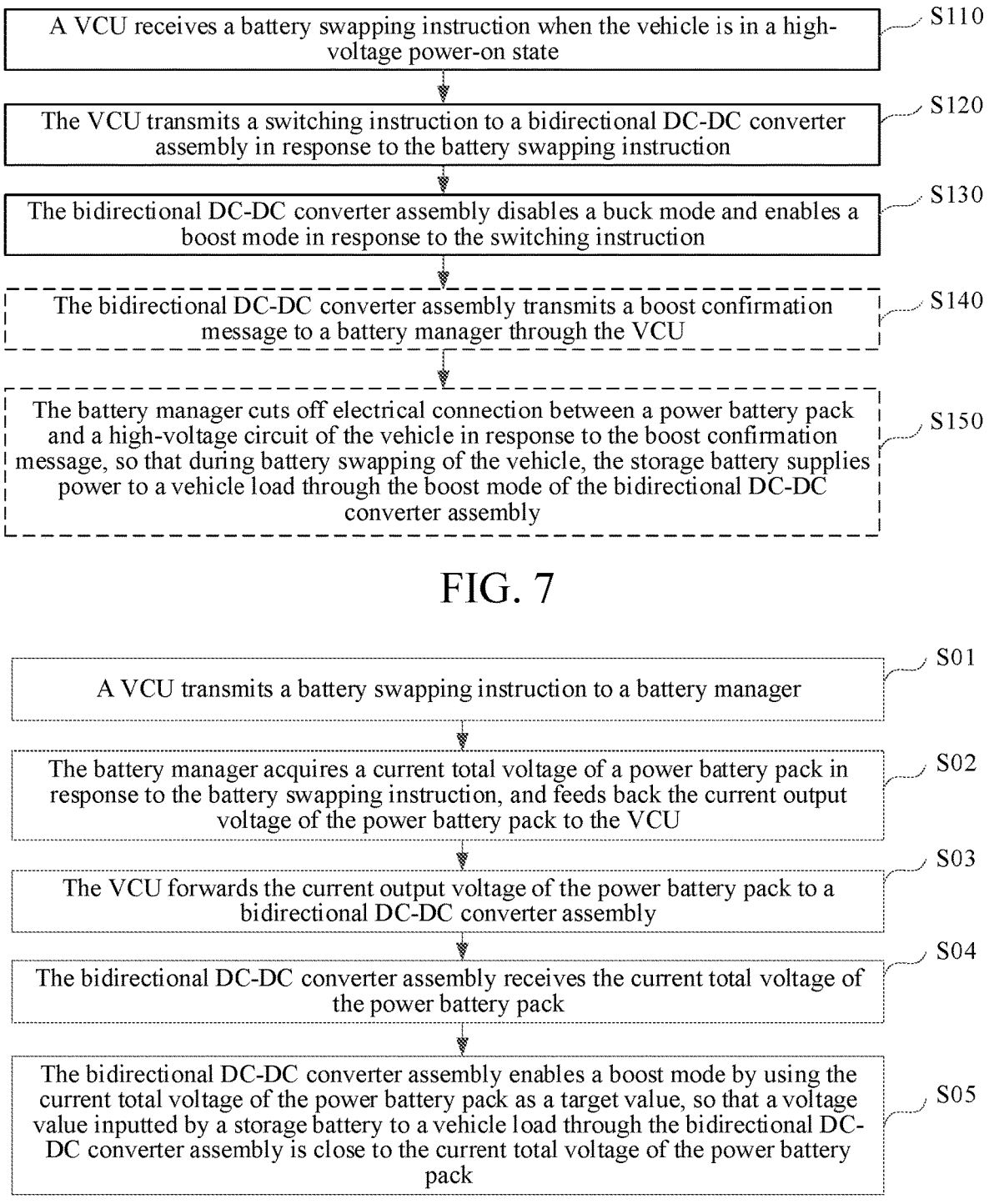

A VCU receives a battery swapping instruction when the vehicle is in a high-voltage power-on state ⟋ S110

The VCU transmits a switching instruction to a bidirectional DC-DC converter assembly in response to the battery swapping instruction ⟋ S120

The bidirectional DC-DC converter assembly disables a buck mode and enables a boost mode in response to the switching instruction ⟋ S130

The bidirectional DC-DC converter assembly transmits a boost confirmation message to a battery manager through the VCU ⟋ S140

The battery manager cuts off electrical connection between a power battery pack and a high-voltage circuit of the vehicle in response to the boost confirmation message, so that during battery swapping of the vehicle, the storage battery supplies power to a vehicle load through the boost mode of the bidirectional DC-DC converter assembly ⟋ S150

FIG. 7

A VCU transmits a battery swapping instruction to a battery manager ⟋ S01

The battery manager acquires a current total voltage of a power battery pack in response to the battery swapping instruction, and feeds back the current output voltage of the power battery pack to the VCU ⟋ S02

The VCU forwards the current output voltage of the power battery pack to a bidirectional DC-DC converter assembly ⟋ S03

The bidirectional DC-DC converter assembly receives the current total voltage of the power battery pack ⟋ S04

The bidirectional DC-DC converter assembly enables a boost mode by using the current total voltage of the power battery pack as a target value, so that a voltage value inputted by a storage battery to a vehicle load through the bidirectional DC-DC converter assembly is close to the current total voltage of the power battery pack ⟋ S05

FIG. 8

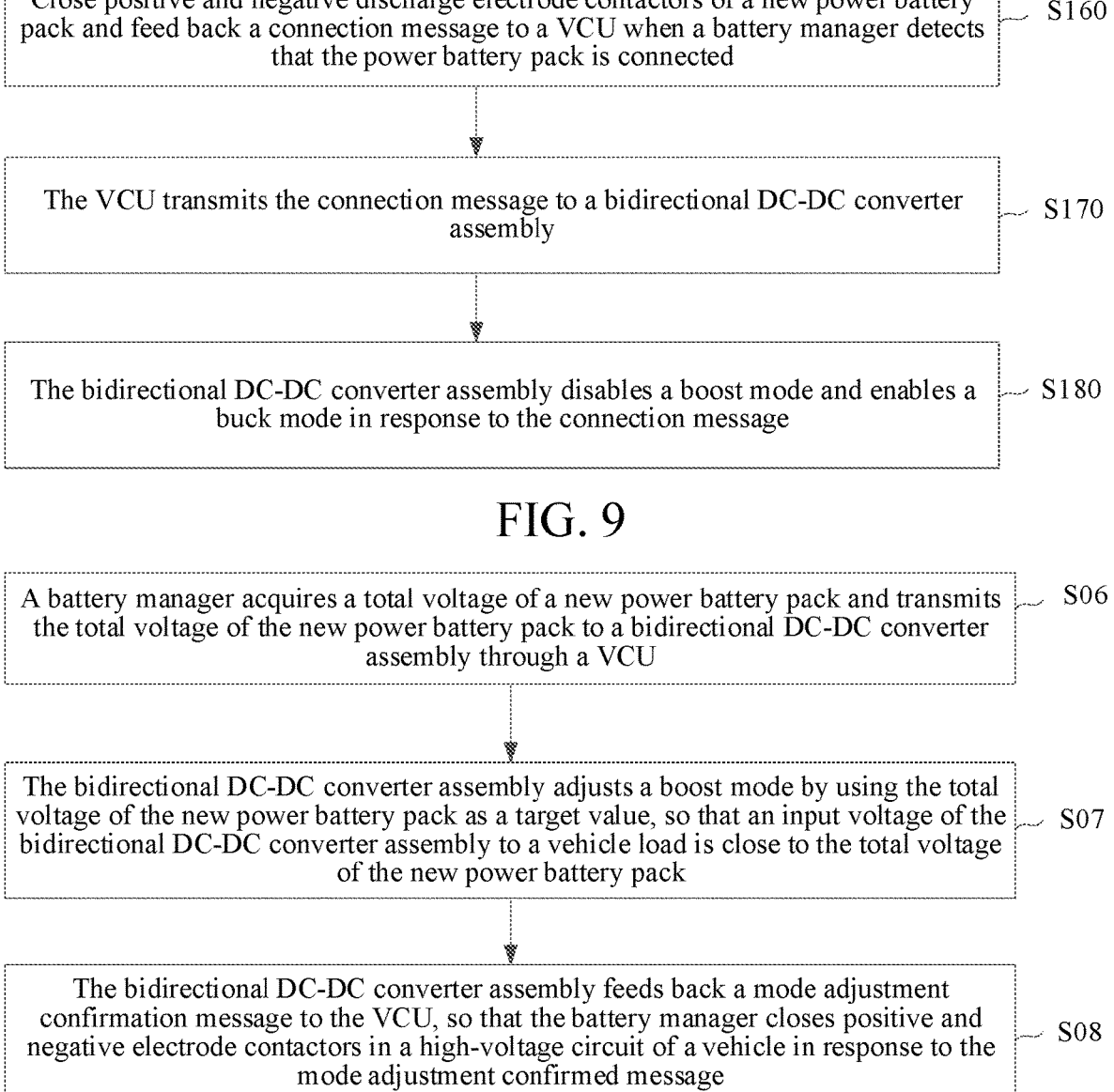

Close positive and negative discharge electrode contactors of a new power battery pack and feed back a connection message to a VCU when a battery manager detects that the power battery pack is connected ⌐ S160

The VCU transmits the connection message to a bidirectional DC-DC converter assembly ⌐ S170

The bidirectional DC-DC converter assembly disables a boost mode and enables a buck mode in response to the connection message ⌐ S180

FIG. 9

A battery manager acquires a total voltage of a new power battery pack and transmits the total voltage of the new power battery pack to a bidirectional DC-DC converter assembly through a VCU ⌐ S06

The bidirectional DC-DC converter assembly adjusts a boost mode by using the total voltage of the new power battery pack as a target value, so that an input voltage of the bidirectional DC-DC converter assembly to a vehicle load is close to the total voltage of the new power battery pack ⌐ S07

The bidirectional DC-DC converter assembly feeds back a mode adjustment confirmation message to the VCU, so that the battery manager closes positive and negative electrode contactors in a high-voltage circuit of a vehicle in response to the mode adjustment confirmed message ⌐ S08

FIG. 10

METHOD AND SYSTEM FOR CONTROLLING BATTERY SWAPPING OF VEHICLE, AND VEHICLE

CROSS-REFERENCE TO RELATED APPLICATIONS

This application is a Continuation Application of International Patent Application No. PCT/CN2022/103848, filed on Jul. 5, 2022, which is based on and claims priority to and benefits of Chinese Patent Application No. 202111167749.1, filed on Sep. 30, 2021. The entire content of all of the above-referenced applications is incorporated herein by reference.

FIELD

The present disclosure generally relates to a method and a system for controlling battery swapping of a vehicle, and a vehicle.

BACKGROUND

Currently, in order to improve safety during battery swapping of a vehicle, a vehicle control unit (VCU) controls a battery controller system to cut off a high-voltage relay, so that a battery swapping execution apparatus can perform a battery swapping operation after the battery controller system cuts off the high-voltage relay, to ensure the safety of a battery box, the performance of the vehicle, and safety of the battery swapping operation.

Currently, the high-voltage power supply is cut off, and then the operation of battery swapping is performed, which makes a high-voltage load of the vehicle operate intermittently, resulting in a failure of some functions of the vehicle and poor passenger experience.

SUMMARY

In view of the above defects or disadvantages in the related art, a method and a system for controlling battery swapping of a vehicle, and a vehicle are provided. During battery swapping, by a boost mode of a bidirectional DC-DC converter assembly, a power supply is reversed to maintain a normal operation of a vehicle load and improve passenger experience.

According to a first aspect, an embodiment of the present disclosure provides a method for controlling battery swapping of a vehicle. The vehicle includes a vehicle control unit (VCU), a bidirectional DC-DC converter assembly, a vehicle load, a power battery, and a storage battery. The bidirectional DC-DC converter assembly has a buck mode and a boost mode. The bidirectional DC-DC converter assembly is in the buck mode when the vehicle is in a high-voltage power-on state. The power battery pack is configured to supply power to the vehicle load and charge the battery through the buck mode of the bidirectional DC-DC converter assembly. The method includes the following steps.

The VCU receives a battery swapping instruction when the vehicle is in the high-voltage power-on state.

The VCU transmits a switching instruction to the bidirectional DC-DC converter assembly in response to the battery swapping instruction.

The bidirectional DC-DC converter assembly disables the buck mode and enables the boost mode in response to the switching instruction, so that a battery controller cuts off electrical connection between the power battery pack and a high-voltage circuit of the vehicle, and the storage battery supplies power to the vehicle load through the bidirectional DC-DC converter assembly.

According to a second aspect, an embodiment of the present disclosure provides a battery swapping system. The system includes a VCU, a bidirectional DC-DC converter assembly, a vehicle load, a battery controller, a power battery pack, and a storage battery. The bidirectional DC-DC converter assembly has a buck mode and a boost mode. The bidirectional DC-DC converter assembly is in the buck mode when the vehicle is in a high-voltage power-on state. The power battery pack is configured to supply power to the vehicle load and charge the battery through the buck mode of the bidirectional DC-DC converter assembly.

The VCU is configured to transmit a switching instruction to the bidirectional DC-DC converter assembly in response to a battery swapping instruction after receiving the battery swapping instruction when the vehicle is in a high-voltage power-on state.

The bidirectional DC-DC converter assembly is configured to disable the buck mode and enable the boost mode in response to the switching instruction, and transmit a boost confirmation message to the battery controller through the VCU. The battery controller is configured to cut off electrical connection between the power battery pack and a high-voltage circuit of the vehicle in response to the boost confirmation message. The storage battery is configured to supply power to the vehicle load through the bidirectional DC-DC converter assembly.

According to a third aspect, an embodiment of the present disclosure provides a vehicle. The vehicle is configured with the system for controlling battery swapping of a vehicle according to the second aspect. The vehicle being configured to perform the method for controlling battery swapping of a vehicle according to the first aspect during swapping of the power battery pack in a high-voltage power-on state.

According to the method and the system for controlling battery swapping of a vehicle, and the vehicle provided by embodiments of the present disclosure, when the power battery pack of the vehicle is replaced in the high-voltage power-on state, the storage battery is configured as the power supply using the mode conversion of the bidirectional DC-DC converter assembly, to ensure that the normal power supply of the vehicle load is still maintained after electrical connection between the vehicle power battery pack and the high-voltage circuit is cut off during battery swapping. As a result, the normal operation of the vehicle load during battery swapping of a vehicle is realized, and user experience is improved.

BRIEF DESCRIPTION OF THE DRAWINGS

Features, objectives, and advantages of the present disclosure become more apparent by detailed description of the embodiments with reference to the drawings.

FIG. 7 is a flowchart of a method for controlling battery swapping of a vehicle according to an embodiment of the present disclosure.

FIG. 8 is a flowchart of a method for controlling battery swapping of a vehicle according to some embodiments of the present disclosure.

FIG. 9 is a flowchart of a method for controlling battery swapping of a vehicle according to some embodiments of the present disclosure.

FIG. 10 is a flowchart of a method for controlling battery swapping of a vehicle according to some embodiments of the present disclosure.

DETAILED DESCRIPTION

Figure 1:
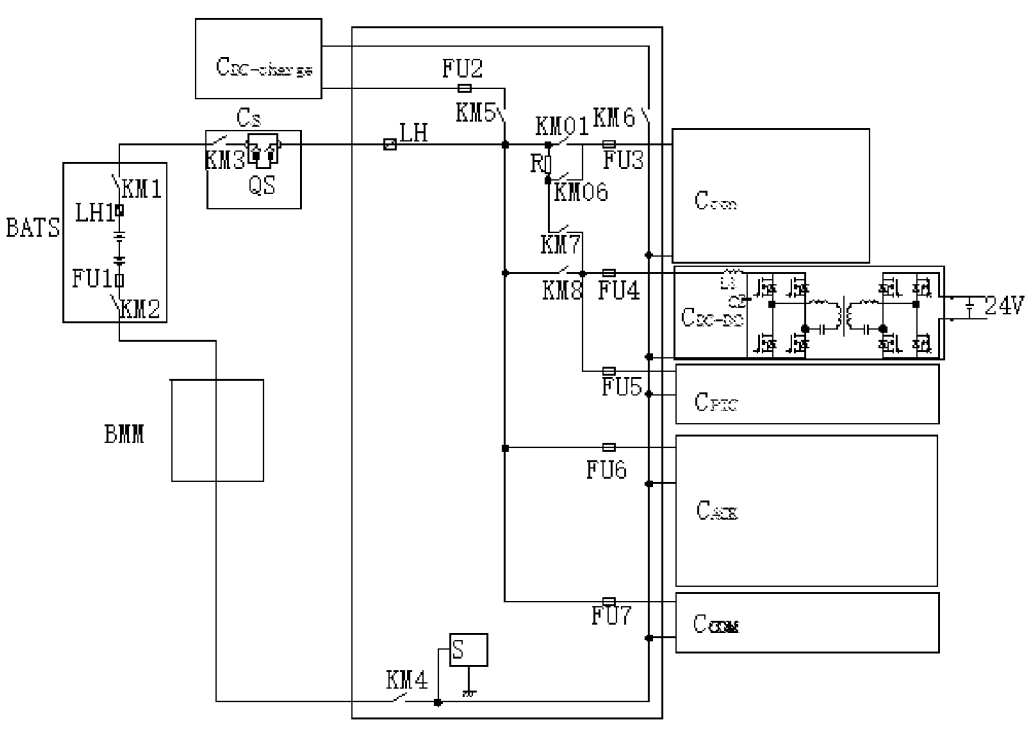
FIG. 1 is a schematic diagram of a topology of a vehicle high voltage circuit according to an embodiment of the present disclosure.

The present disclosure is described below in further details with reference to the drawings and the embodiments. It may be understood that the embodiments described herein are used for explaining but not limiting a related present disclosure. Further, it is to be understood that for ease of description, not all parts of the present disclosure are shown in the drawings.

It should be noted that the embodiments in the present disclosure and features in the embodiments may be mutually combined in case that no conflict occurs. The present disclosure is described below in detail with reference to the drawings and the embodiments.

It may be understood that during an operation of a rail transit vehicle, such as a light rail or a subway, a fixed operation route is configured, and a charge station is arranged on an operation route to charge a power battery in the vehicle. In an embodiment, during an operation of an electric vehicle or a hybrid vehicle, such as a public transport vehicle, the power battery in the vehicle is also required to be charged at the configured charge station. In the above charge process, a lot of time is wasted.

Currently, in order to improve the operational efficiency of the vehicle and improve safety of the power battery, power battery packs in the rail transit vehicle or the electric vehicle are pre-charged through a battery swapping station, so that during the operation of the vehicle, when the power in the power battery is insufficient, the power battery having insufficient power can be swapped with a fully-charged power battery provided by the battery swapping station.

In an embodiment of the present disclosure, by ensuring safe connection between a battery box and a body during battery swapping, a safe and reliable battery swapping operation can be realized, and the normal operation of the remaining loads of the vehicle can still be maintained during the battery swapping to improve user experience.

FIG. 1 to FIG. 5 are schematic diagrams of a topology of a vehicle high voltage circuit according to an embodiment of the present disclosure. As shown in FIG. 1, a high-voltage power supply structure of the vehicle may include a power battery pack BATS, a battery manager (BMM e.g., a battery controller), a maintenance switch assembly Cs, a high-voltage distribution circuit, a direct current charge assembly CDC-charge, a motor control unit assembly Ccon, a bidirectional DC-DC converter assembly CDC-DC, a heater assembly CPTC, an air conditioner assembly CACE, an air compressor assembly Ccom, and the like.

Figure 2:
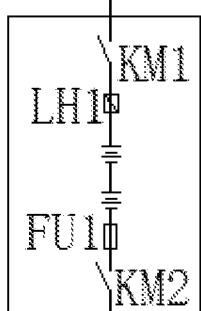
FIG. 2 is a schematic diagram of a topology of a circuit of a battery of a vehicle according to an embodiment of the present disclosure.

As shown in FIG. 2, the power battery pack includes a battery pack fuse FU1, a current transformer LH1, a positive discharge electrode contactor of a power battery pack KM1, and a negative discharge electrode contactor of a power battery pack KM2. In other words, opening and closing of the positive discharge electrode contactor of a power battery pack KM1 and the negative discharge electrode contactor of a power battery pack KM2 are controlled by the battery manager, so that the power battery pack and the high-voltage circuit of the vehicle are disconnected and connected.

Figure 3:
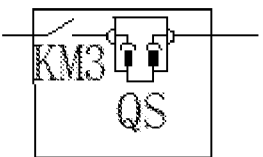
FIG. 3 is a schematic diagram of a topology of a circuit of a maintenance switch of a vehicle according to an embodiment of the present disclosure.
Figure 4:
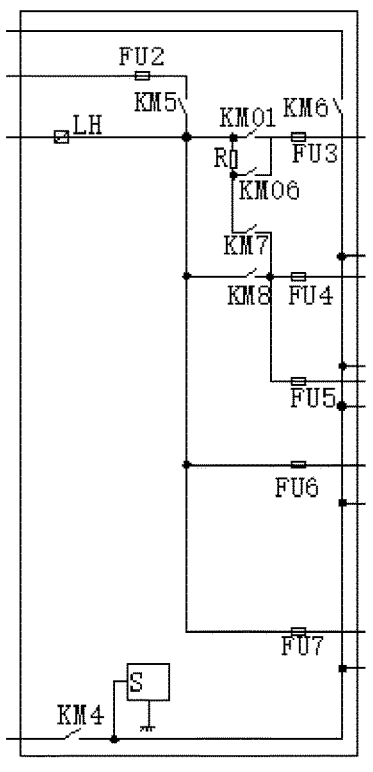
FIG. 4 is a schematic diagram of a topology of a high-voltage distribution circuit of a vehicle according to an embodiment of the present disclosure.

In addition, as shown in FIG. 3 and FIG. 4, the high-voltage circuit structure may further include a positive discharge electrode contactor KM3 of a main circuit and a negative discharge electrode contactor KM4 of the main circuit. The main discharge positive electrode contactor KM3 is arranged/disposed in the maintenance switch assembly, and the negative discharge electrode contactor KM4 of the main circuit is arranged in the high-voltage distribution circuit.

The vehicle can be powered on by opening and closing the positive discharge electrode contactor KM3 of the main circuit and the negative discharge electrode contactor KM4 of the main circuit.

The heater assembly, the air conditioner assembly, the air compressor assembly, and the like are configured as the load assembly of the vehicle, that is, the vehicle load.

FIG. 4 is a circuit topology of a high-voltage distribution circuit in a vehicle according to an embodiment of the present disclosure. As shown in FIG. 4, the circuit fuses and switch devices for vehicle loads are arranged/disposed in the high-voltage distribution circuit.

Figure 5:
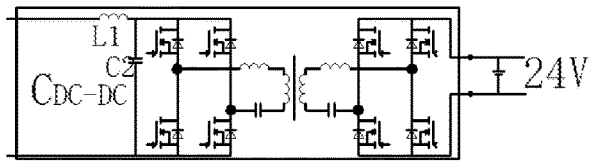
FIG. 5 is a schematic diagram of a topology of a circuit of a bidirectional DC-DC converter assembly and a circuit of a storage battery of a vehicle according to an embodiment of the present disclosure.

FIG. 5 is a topology diagram of a circuit of a bidirectional DC-DC converter assembly CDC-DC and a 24 V battery according to an embodiment of the present disclosure. The bidirectional DC-DC converter assembly can realize a bidirectional mode of boost and buck. That is to say, as shown in FIG. 5, both sides of the bidirectional DC-DC converter assembly are respectively electrically connected to the power battery pack and the storage battery, so that in a vehicle power-on mode, the bidirectional DC-DC converter assembly enables the buck mode, disables the boost mode, charges the storage battery, and supplies power to the vehicle load through an internally configured coil.

Further, in an embodiment of the present disclosure, when the vehicle enters the battery swapping mode, the bidirectional DC-DC converter assembly is adjusted to the boost mode, that is, the buck mode is turned off and the boost mode is turned on to supply power to the vehicle load. In addition, after the battery swapping is completed, the buck mode may be switched again to recharge the storage battery and supply power to the vehicle load.

The storage battery may be a 24 V battery.

Figure 6:
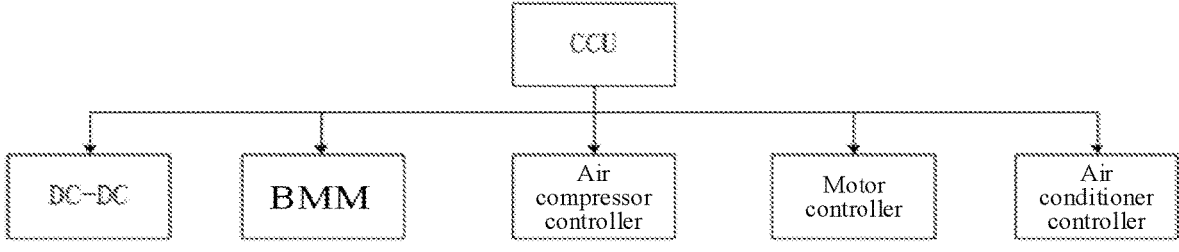
FIG. 6 is a schematic diagram of a network communication structure of a vehicle according to an embodiment of the present disclosure.

It may be understood that, as shown in FIG. 6, the VCU in the above circuit structure can communicate with devices such as the bidirectional DC-DC converter assembly, the battery manager, the motor control unit, the air conditioner control unit in the air conditioner assembly, and the control unit in the air compressor assembly to realize the control of each device.

That is to say, in an embodiment of the present disclosure, to ensure safe connection between the battery box and the body during battery swapping, by realizing a safe and reliable battery swapping operation and using the boost and buck mode conversion of the bidirectional DC-DC converter assembly, the storage battery is configured as the power supply, so that during battery swapping, after cutting off the high-voltage contactor, a normal power supply of the vehicle load is still maintained, and the seamless connection between the power battery and the storage battery to the load power supply is realized.

In order to better understand the battery swapping control process provided by the embodiment of the present disclosure, the detailed description with reference to FIG. 7 and FIG. 8 is provided below.

FIG. 7 is a flowchart of a battery swapping control method according to an embodiment of the present disclosure. The method is applicable to a vehicle, and the vehicle is configured with a circuit structure as shown in FIG. 1 to FIG. 6. The method includes the following steps.

S110: The VCU receives a battery swapping instruction when the vehicle is in a high-voltage power-on state.

S120: The VCU transmits a switching instruction to the bidirectional DC-DC converter assembly in response to the battery swapping instruction.

S130: The bidirectional DC-DC converter assembly disables the buck mode and enables the boost mode in response to the switching instruction.

In an embodiment, the vehicle is in a high-voltage power-on state, that is, in a case that the VCU determines that the vehicle is currently in a power-on state, when the battery swapping operation is required, a current power battery pack is to be removed and a new power battery pack that has been charged is to be connected to the vehicle. In this way, a user may input a battery swapping instruction to the VCU by operating a control panel. The VCU may transmit the switching instruction to the bidirectional DC-DC converter assembly in response to the battery swapping instruction after receiving the battery swapping instruction, so that the bidirectional DC-DC converter assembly may disable the current buck mode and enable the boost mode in response to the switching instruction. In this way, when the battery manager cuts off electrical connection between the power battery pack and the high-voltage circuit of the vehicle during the battery swapping of a vehicle, the storage battery supplies power to the vehicle load through the bidirectional DC-DC converter assembly.

That is to say, the storage battery supplies power to the vehicle load through the boost mode of the bidirectional DC-DC converter assembly, so as to realize the seamless switching power supply of the vehicle load and to ensure that the normal load always maintains at an operating state.

It may be understood that, in an embodiment of the present disclosure, at the beginning of performing the above method, the vehicle is in the high-voltage power-on state, that is, in the power-on state, so that the boost mode can be turned on through the bidirectional DC-DC converter assembly to supply power to the vehicle load before cutting off the high-voltage electrical connection. By ensuring the normal operation of the normal load, when cutting off electrical connection between the battery pack and the high-voltage circuit, the vehicle is in the high-voltage safe state, and then the battery swapping operation is performed to ensure the high-voltage safety of the battery swapping and to maintain the normal operation of the normal load.

It may be further understood that, after the battery swapping instruction is acquired in the high-voltage power-on state, the VCU may block a vehicle traction. In this way, when the battery swapping is performed subsequently, due to the blocking of the vehicle traction, safety of the battery swapping can be ensured. After the battery swapping is completed, the VCU can lift the blocking of the vehicle traction.

In addition, when it is determined by the VCU that the vehicle is currently in an unpowered state and requires to perform the battery swapping operation, the battery swapping operation can be performed directly without requiring engagement of the battery manager and the bidirectional DC-DC converter assembly.

In an embodiment of the present disclosure, using the boost and buck mode conversion of the bidirectional DC-DC converter assembly, the storage battery is configured as the power supply to ensure that, after cutting off connection between the power battery pack and the high-voltage circuit of the vehicle, the normal power supply of the vehicle load is still maintained during battery swapping. As a result, the normal operation of the load is realized during the battery swapping, and user experience is improved.

Further, after the bidirectional DC-DC converter assembly disables the buck mode and enables the boost mode in response to a first switching instruction to successfully supply power to the vehicle load, the VCU can receive a boost confirmation message that the boost mode is turned on, so that the VCU transmits an instruction to the battery manager to control the battery manager to disconnect the electrical connection between the power battery pack and the high-voltage circuit of the vehicle.

As shown in FIG. 7, the method may further include the following steps.

S140: The bidirectional DC-DC converter assembly transmits a boost confirmation message to the battery manager through the VCU.

S150: The battery manager cuts off the electrical connection between the power battery pack and the high-voltage circuit of the vehicle in response to the boost confirmation message.

In an embodiment, after the VCU receives the boost confirmation message from the bidirectional DC-DC converter assembly when the boost mode is turned on, it indicates that the bidirectional DC-DC converter assembly can normally supply power to the vehicle load, that is, the battery swapping preparation is done. As a result, the VCU can forward the boost confirmation message to the battery manager, so that after receiving the boost confirmation message and in response to the boost confirmation message, the battery manager performs the disconnection operation of the high-voltage circuit, and cuts off electrical connection between the power battery pack and the high-voltage circuit of the vehicle. As a result, when the subsequent battery swapping is performed, the vehicle is in the high-voltage safe state.

For example, as shown in FIG. 1 and FIG. 4, after receiving the boost confirmation message, the battery manager disconnects the positive and negative discharge electrode contactors (KM1 and KM2) of a power battery pack, and the positive and negative discharge electrode contactors (KM3 and KM4) of a main circuit.

It may be understood that after the above disconnection operation is completed, the battery swapping operation may be performed, that is, the vehicle is swapped with the new power battery pack.

In an embodiment, in an embodiment of the present disclosure, in order to improve user experience and the vehicle load maintains a constant output power during battery swapping, before the bidirectional DC-DC converter assembly switches a mode, that is, turning off the buck mode and turning on the boost mode, as shown in FIG. 8, the method may further include the following steps.

S01: The VCU transmits a battery swapping instruction to the battery manager.

S02: The battery manager acquires a current total voltage of the power battery pack in response to the battery swapping instruction, and feeds back the current output voltage of the power battery pack to the VCU.

S03: The VCU forwards the current output voltage of the power battery pack to the bidirectional DC-DC converter assembly.

S04: The bidirectional DC-DC converter assembly receives the current total voltage of the power battery pack.

S05: The bidirectional DC-DC converter assembly enables the boost mode using the current total voltage of the power battery pack as a target boost value, so that a voltage value inputted by the storage battery to the vehicle load through the bidirectional DC-DC converter assembly is close to the target boost value, for example, the difference between the input voltage value and the target boost value is within about ±10 V.

In an embodiment, the VCU acquires the battery swapping instruction in the high-voltage power-on state. When transmitting the battery swapping instruction to the bidirectional DC-DC converter assembly, the battery swapping instruction may further be transmitted to the battery manager synchronously or asynchronously, so that the battery manager can collect the current output voltage of the vehicle power battery pack in response to the battery swapping instruction, that is, the total voltage, and feed the voltage back to the VCU.

After the VCU receives the output voltage, the output voltage may be forwarded to the bidirectional DC-DC converter assembly, so that the bidirectional DC-DC converter assembly can disable the buck mode and enable the boost mode based on the current output voltage of the power battery pack. That is to say, the bidirectional DC-DC converter assembly enables the boost mode using the current output voltage of the power battery pack as the target boost value to supply power to the vehicle load, and ensures that the input voltage of the storage battery to the vehicle load through the bidirectional DC-DC converter assembly is substantially consistent with the current power supply voltage (the target boost value) of the power battery pack, so as to ensure a stable operation of the vehicle load during battery swapping and further improve user experience.

It may be understood that, in an embodiment of the present disclosure, when the battery manager disconnects connection between the power battery pack and the high-voltage circuit through the above operation, and the storage battery supplies stable power to the vehicle load through the boost mode of the bidirectional DC-DC converter assembly, the user can perform the battery swapping operation. That is to say, the user can remove the current power battery pack and connect the new power battery pack that has been charged to the vehicle.

Further, as shown in FIG. 9, when the new power battery pack is connected to the vehicle, in order to ensure that the vehicle is normally powered on, the method may further include the following steps.

S160: The positive and negative discharge electrode contactors of the new power battery pack is closed and a connection message is fed back to the VCU when the battery manager detects that the new power battery pack is connected.

S170: The VCU transmits the connection message to the bidirectional DC-DC converter assembly.

S180: The bidirectional DC-DC converter assembly disables the boost mode and enables the buck mode in response to the connection message.

In an embodiment, after configuring the new power battery pack to the vehicle, the battery manager can detect the access of the new power battery, and can control the closed contactor to connect the new power battery pack to the high-voltage circuit.

Further, the battery manager can feed back the connection message of the new power battery pack to the VCU, indicating that the new power battery pack has been connected. The VCU can forward the connection message to the bidirectional DC-DC converter assembly. After receiving the connection message, the bidirectional DC-DC converter assembly can switch the mode in response to the connection message, that is, disable the boost mode and enable the buck mode.

For example, the battery manager can detect the access of the new power battery pack at a preset frequency, and when the access of the new power battery pack is detected, the confirmation message can be fed back to the VCU.

In an embodiment, it is also possible to trigger the battery manager to successfully detect the new power battery pack access through manual operation by the user. For example, by setting a button or the like, a signal for the access of the new power battery pack is entered into the battery manager.

As shown in FIG. 10, in an embodiment of the present disclosure, in order to make a stable voltage input to the vehicle load before and after the battery swapping and avoid current shock, before turning on the buck mode, the method may further include the following steps.

S06: The battery manager acquires a total voltage of the new power battery pack and transmits the total voltage of the new power battery pack to the bidirectional DC-DC converter assembly through the VCU.

S07: The bidirectional DC-DC converter assembly adjusts the boost mode using the total voltage of the new power battery pack as a target value, so that an input voltage of the bidirectional DC-DC converter assembly to the vehicle load is close to the total voltage of the new power battery pack, for example, the difference between the input voltage and the total voltage of the new power battery pack is within about ±10 V.

S08: The bidirectional DC-DC converter assembly feeds back a mode adjustment confirmation message to the VCU, so that the battery manager closes the positive and negative electrode contactors in the high-voltage circuit of the vehicle in response to the mode adjustment confirmation message.

In an embodiment, after detecting that the new power battery pack is connected, the battery manager can collect the total voltage of the new power battery pack, and transmit the total voltage of the new power battery pack to the bidirectional DC-DC converter assembly through the VCU, so that when the bidirectional DC-DC converter assembly switches the mode, that is, after turning off the buck mode and before turning on the boost mode, the total voltage of the new power battery pack is used as the target value to adjust the boost mode. As a result, the input voltage of the bidirectional DC-DC converter assembly to the vehicle load is close to the total voltage of the new power battery pack, to ensure that the positive and negative electrode contactors in the high-voltage circuit of the vehicle are closed in the battery manager, so that the vehicle load can maintain a stable operation, and avoid the current impact.

Further, after the adjustment of the boost mode is completed, the bidirectional DC-DC converter assembly can feed back the mode adjustment confirmation message to the VCU, indicating that the new power battery pack can be connected to the high-voltage circuit of the vehicle. After receiving the mode adjustment confirmation message, the VCU can transmit the mode adjustment confirmation message to the battery manager, so that the battery manager closes the contactors between the power battery pack and the high-voltage circuit in response to the mode adjustment confirmation message, and connects the power battery pack and the high-voltage circuit.

For example, when the battery manager detects the new power battery pack, the positive and negative discharge electrode contactors (KM1 and KM2) of the new battery pack may be controlled to close. Further, the total voltage of the new power battery pack acquired from the battery manager is transmitted to the bidirectional DC-DC converter assembly via the VCU. The bidirectional DC-DC converter assembly adjusts the boost mode using the total voltage of the new power battery pack as the target value. Further, after the adjustment is successful, the bidirectional DC-DC converter assembly transmits the mode adjustment confirmation message that the battery swapping is ready to be connected to the VCU. The VCU forwards the mode adjustment confirmation message to the BMM. After receiving the mode adjustment confirmation message, the BMM may control to close the positive and negative discharge electrode contactors of the main circuit (KM3 and KM4).

Further, after the entire high-voltage circuit is connected, that is, after the vehicle is powered on with the new power battery pack, a power-on confirmation message is fed back to the VCU through the battery manager. The VCU further forwards the power-on confirmation message to the bidirectional DC-DC converter assembly, so that the bidirectional DC-DC converter assembly enables the buck mode to complete the battery swapping operation.

Further, it may be understood that after completing the above battery swapping operation, that is, the vehicle is powered on again, and after the bidirectional DC-DC converter assembly enables the buck mode, the vehicle can travel normally, the VCU can release the blocking of the vehicle traction, and the swapping operation is completed.

It may be understood that, in an embodiment of the present disclosure, after the new power battery pack is swapped onto the vehicle, when the bidirectional DC-DC converter assembly resumes the buck mode, the boost mode is adjusted based on the current total voltage of the new power battery pack. In this way, an impulse current does not exist when the BMM closes the positive and negative discharge electrode contactors of the main circuit.

Figure 11:
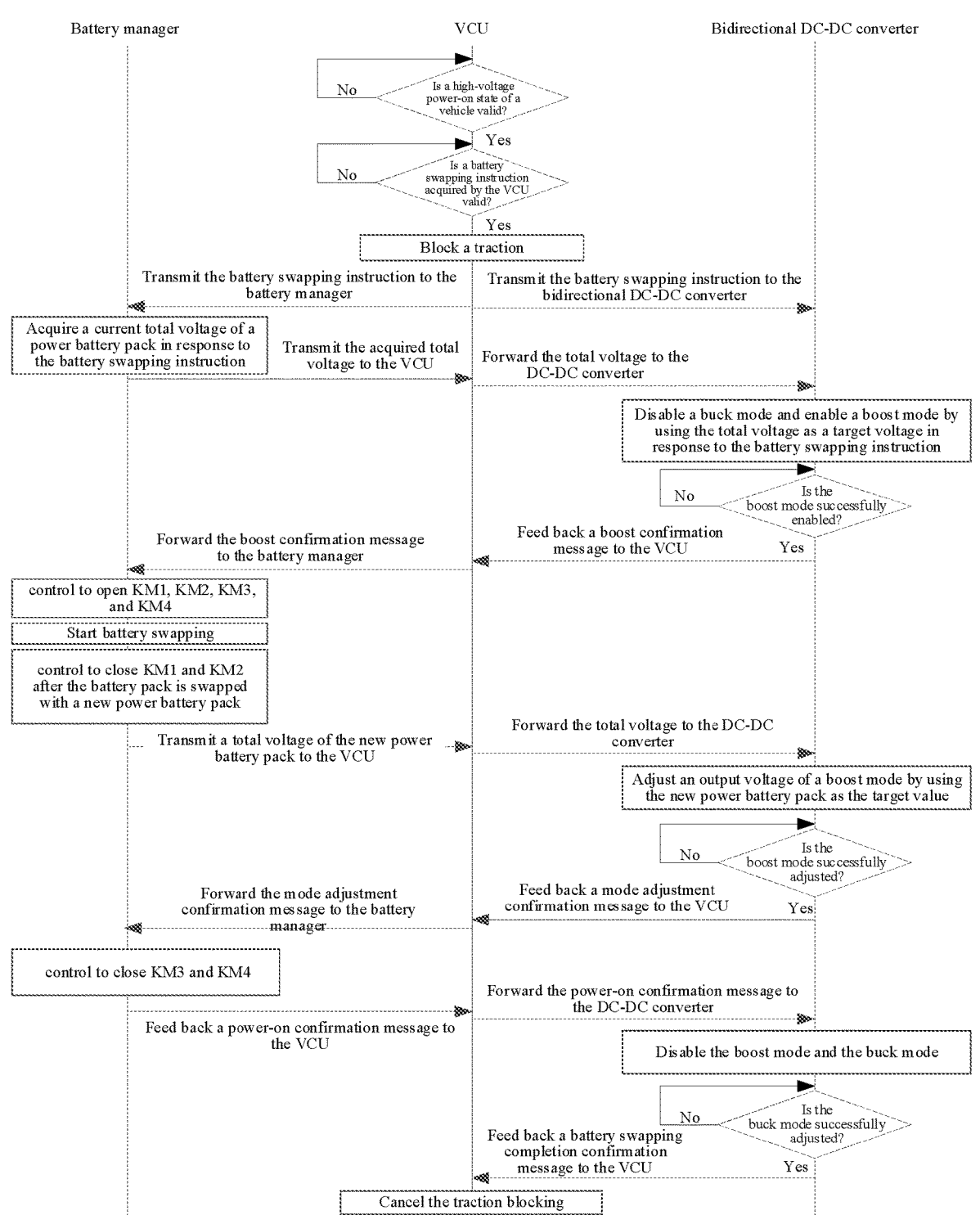
FIG. 11 is a flowchart of a method for controlling battery swapping of a vehicle according to some embodiments of the present disclosure.

In order to better understand the battery swapping control process provided by the embodiment of the present disclosure, detail description with reference to FIG. 11 is provided below.

As shown in FIG. 11, whether the vehicle is in the high-voltage power-on state is determined by the VCU. When the vehicle is in the high-voltage power-on state, the battery swapping instruction inputted by the user is acquired, and after the battery swapping instruction is acquired, the VCU blocks the traction of the vehicle.

Further, the VCU can transmit the battery swapping instruction to the bidirectional DC-DC converter assembly and the battery manager. The battery manager acquires the current total voltage of the power battery pack, and forwards the current total voltage acquired from the power battery pack to the bidirectional DC-DC converter assembly via the VCU. The bidirectional DC-DC converter assembly disables the buck mode, and enables the boost mode using the current total voltage of the power battery pack as the target value to supply power to the vehicle load.

Further, after the bidirectional DC-DC converter assembly switched to the boost mode, the bidirectional DC-DC converter assembly is ready for battery swapping, that is, the boost confirmation message is transmitted to the battery manager. After receiving the boost confirmation message, the battery manager disconnects the positive and negative discharge electrode contactors (KM1 and KM2) of the power battery pack, disconnects the positive and negative discharge electrode contactors (KM3 and KM4) of the main circuit, and starts the battery swapping.

After the power battery pack is swapped with a new power battery pack, the battery manager may control to close the positive and negative discharge electrode contactors (KM1 and KM2) of the new power battery pack, and transmit a total voltage acquired from the new battery pack to the bidirectional DC-DC converter assembly via the VCU. The bidirectional DC-DC converter assembly adjusts the boost mode using the total voltage of the new power battery pack as the target value.

When the boost mode is adjusted successfully, the bidirectional DC-DC converter assembly sends a message that battery swapping is ready, that is, the mode adjustment confirmation message, to the battery manager through VCU. After receiving the mode adjustment confirmation message, the battery manager may control to close the positive and negative discharge electrode contactors (KM3 and KM4) of the main circuit.

In addition, after the battery manager closes the positive and negative discharge electrode contactors (KM3 and KM4) of the main circuit, the battery swapping is completed, the power-on confirmation message is transmitted to the bidirectional DC-DC converter assembly via the VCU. After the bidirectional DC-DC converter assembly receives the power-on confirmation message, in response to the power-on confirmation message, the boost mode is turned off and the buck mode is turned on. In addition, after the buck mode is turned on, the bidirectional DC-DC converter assembly transmits a message that the battery swapping is complete, that is, the completion confirmation message is transmitted to the VCU, the VCU releases the blocking of the vehicle traction, and the battery swapping operation is completed.

It may be understood that, in an example of the present disclosure, when the vehicle battery swapping is performed in the high-voltage power-on state, the current total voltage of the power battery pack to be swapped is the target value. The vehicle load is powered by the bidirectional DC-DC converter assembly, and the stable operation of the vehicle load is maintained after the power battery pack is disconnected from the high-voltage circuit of the vehicle. In addition, after the new power battery pack is swapped onto the vehicle, when the bidirectional DC-DC converter assembly resumes the buck mode, the boost mode is adjusted using the current total voltage of the new power battery pack as the target value. In this way, the impulse current does not exist when the BMM controls to close the positive and negative discharge electrode contactors of the main circuit, which realizes the high-voltage safety of the battery swapping operation, maintains the continuous stable operation of the vehicle load, and improves user experience.

On the other hand, an embodiment of the present disclosure further provides a vehicle. The vehicle includes the circuit structure shown in FIG. 1 to FIG. 5, and the electrical device in the circuit structure is shown in FIG. 6 to achieve the electrical connection.

During the power-on operation of the vehicle, that is, the vehicle is in the high-voltage power-on state, and when the battery swapping is required, the battery swapping method described in the above embodiment can be used to perform the battery swapping. That is, when the battery swapping mode is entered, the bidirectional DC-DC converter assembly is adjusted to the boost mode, which seamlessly switches the power supply mode for the vehicle load, and can boost the voltage using the current total voltage of the power battery pack as the target value, so that the impulse current does not exist when the battery manager controls to open the positive and negative discharge electrode contactors of the power battery pack, and to open the positive and negative discharge electrode contactors of the main circuit. Further, after the new power battery pack is swapped onto the vehicle, the bidirectional DC-DC converter assembly adjusts the boost mode using the current total voltage of the new power battery pack as the target value, so that the impulse current does not exist when the battery manager controls to close the positive and negative discharge electrode contactors of the power battery pack, and to close the positive and negative discharge electrode contactors of the main circuit.

On the other hand, an embodiment of the present disclosure further provides a processing device. The processing device includes a memory, a processor, and a computer program stored on the memory and executed by the processor. The processor is configured to implement the method for controlling battery swapping of a vehicle described in the above embodiment when executing the program.

The processing device may be an integrated circuit configured in the VCU, the battery manager, or the bidirectional DC-DC converter assembly.

Figure 12:
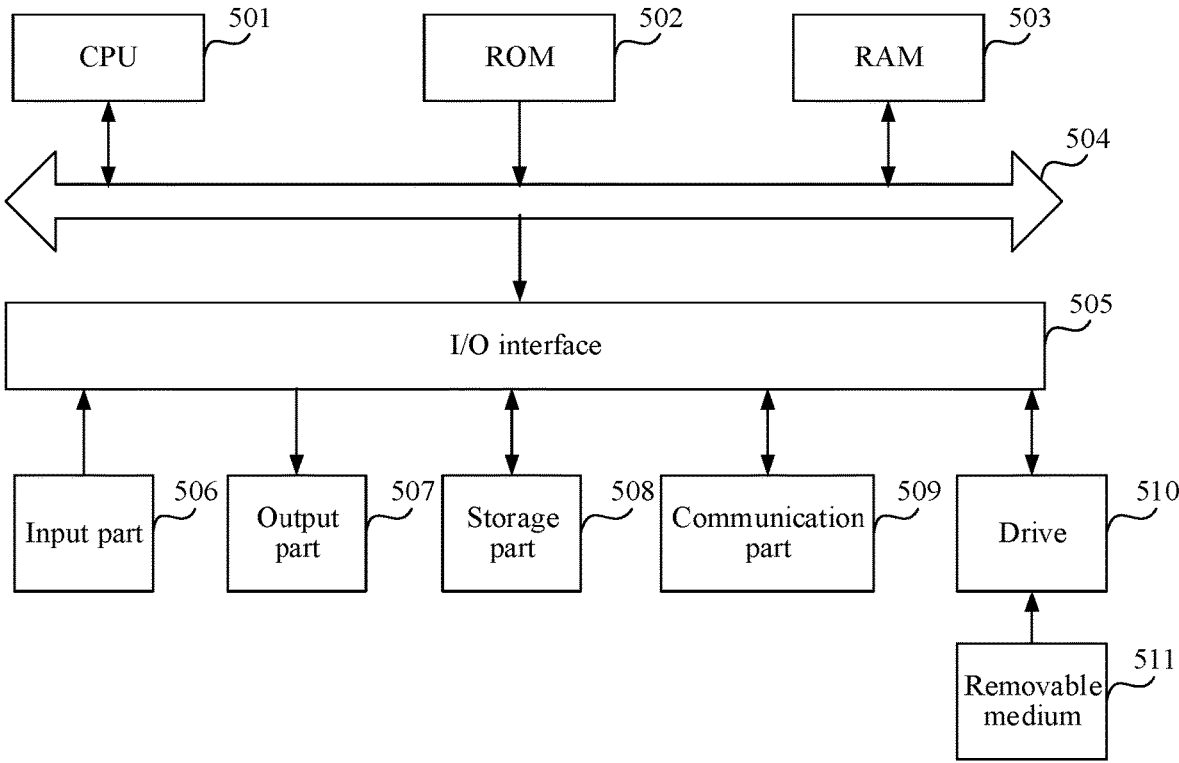
FIG. 12 is a schematic structural diagram of a computer of a processing device according to an embodiment of the present disclosure.

FIG. 12 is a schematic structural diagram of a computer of a processing device according to an embodiment of the present disclosure.

As shown in FIG. 12, the computer electronic device 500 includes a central processing unit (CPU) 501, which can perform various actions and processing according to a program stored in a read-only memory (ROM) 502 or a program loaded into a random access memory (RAM) 503 from a storage part 502. The RAM 503 further stores various programs and data required for the operation of the computer electronic device 500. The CPU 501, the ROM 502, and the RAM 503 are connected to each other through a bus 504. An input/output (I/O) interface 505 is also connected to the bus 504.

The following components are connected to the I/O interface 505: an input part 506 including a keyboard and a mouse; an output part 507 including a cathode ray tube (CRT), a liquid crystal display (LCD), a speaker, and the like; a storage part 508 including a hard disk; and a communication part 509 including a network interface card such as an LAN card or a modem and the like. The communication part 509 performs communication processing by a network such as the Internet. A driver 510 is also connected to the I/O interface 505 as required. A removable medium 511, such as a magnetic disk, an optical disc, a magnetooptical disk, or a semiconductor memory, is installed on the driver 510 as required, so that a computer program read from the removable medium is installed into the storage part 508 as required.

In particular, according to the embodiments of the present disclosure, the processes described above with reference to the flowchart may be implemented as a computer software program. For example, the embodiments of the present disclosure include a computer program product, including a computer program carried on a machine-readable medium. The computer program includes program code for performing the method shown in the flowchart. In such an embodiment, the computer program may be downloaded and installed from a network through the communication part 509, and/or installed from the removable medium 511. When the computer program is executed by the central processing unit (CPU) 501, the above functions defined in the electronic device of the present disclosure are performed.

It should be noted that the non-transitory computer-readable medium according to present disclosure may be a computer-readable signal medium or a computer-readable storage medium or any combination of the two media. The computer-readable storage medium may be, for example, but is not limited to, an electric, magnetic, optical, electromagnetic, infrared, or semi-conductive electric device, apparatus, or component, or any combination of the above. More examples of the computer-readable storage medium may include, but are not limited to: an electrical connection by one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical memory device, a magnetic storage device or any appropriate combination thereof. In the present disclosure, the computer-readable storage medium may be any tangible medium including or storing a program, and the program may be used by or in combination with an instruction execution electronic device, apparatus, or device. In the present disclosure, the computer readable signal medium may be a data signal included in a baseband or propagated as a part of a carrier, in which computer readable program code is carried. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may be used for sending, propagating, or transmitting a program used by or in combination with an instruction execution electronic device, apparatus, or device. The program code included in the computer-readable medium may be transmitted by any suitable medium, including but not limited to, wireless transmission, a wire, a cable, radio frequency (RF) or the like, or any other suitable combination thereof.

Flowcharts and block diagrams in the drawings illustrate architectures, functions, and operations that may be implemented by the processing device, the method, and the computer program product according to the various embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may occur in a sequence different from that annotated in an accompanying drawing. For example, two boxes shown in succession may be performed basically in parallel, and sometimes the two boxes may be performed in a reverse sequence. This is determined by a related function. It should also be noted that, each box in a block diagram and/or a flowchart and a combination of boxes in the block diagram and/or the flowchart may be implemented by a dedicated hardware-based electronic device configured to perform a specified function or operation, or may be implemented by a combination of dedicated hardware and a computer instruction.

The units or modules described in the embodiments of the present disclosure may be implemented by software or hardware. The described units or modules may be provided in a processor, for example, may be described as a processor, including an obtaining module. For example, the training module may further be described as "for the VCU to obtain the battery swapping instruction when the vehicle is in the high-voltage power-on state".

In another aspect, the present disclosure further provides a computer-readable storage medium. The computer-readable storage medium may be included in the electronic device described in the above embodiments, or may exist alone without being assembled into the electronic device. The computer-readable storage medium described above stores one or more programs, when the above programs are used by one or more processors to execute the method for controlling battery swapping of a vehicle described in the present disclosure.

Based on the above, according to the battery swapping control method and system and the vehicle provided by embodiments of the present disclosure, when the vehicle performs the battery swapping operation in the high-voltage power-on state, the storage battery is configured as the power supply using the mode conversion of the bidirectional DC-DC converter assembly, to ensure that the normal power supply of the vehicle load is still maintained after electrical connection between the vehicle power battery pack and the high-voltage circuit is cut off during battery swapping. As a result, the normal operation of the vehicle load during battery swapping of a vehicle is realized, and user experience is improved.

The above description is merely a preferred embodiment of the present disclosure and a description of the applied technical principles. A person skilled in the art should understand that the scope of the present disclosure is not limited to the technical solutions formed by the combination of the above technical features, but also covers other technical solutions formed by any combination of the above technical features or their equivalent features without departing from the concept of the present disclosure, for example, technical solutions formed by replacing the above features with (but not limited to) technical features having similar functions disclosed in the present disclosure.

What is claimed is:

1. A method for controlling battery swapping of a vehicle, the vehicle comprising a vehicle control unit (VCU), a bidirectional DC-DC converter assembly, a power battery pack, and a storage battery, the bidirectional DC-DC converter assembly having a buck mode and a boost mode, the bidirectional DC-DC converter assembly being in the buck mode when the vehicle is in a high-voltage power-on state, the power battery pack being configured to supply power to a vehicle load of the vehicle and charge the storage battery through the bidirectional DC-DC converter assembly, and the method comprising:

receiving, by the VCU, a battery swapping instruction when the vehicle is in the high-voltage power-on state;

transmitting, by the VCU, a switching instruction to the bidirectional DC-DC converter assembly in response to the battery swapping instruction;

disabling, by the bidirectional DC-DC converter assembly, the buck mode in response to the switching instruction to cut off electrical connection between the power battery pack and a high-voltage circuit of the vehicle by a battery controller, and enabling the boost mode in response to the switching instruction to supply power to the vehicle load by the storage battery through the bidirectional DC-DC converter assembly;

transmitting, by the bidirectional DC-DC converter assembly, a boost confirmation message to the battery controller through the VCU; and cutting off, by the battery controller, the electrical connection between the power battery pack and the high-voltage circuit of the vehicle in response to the boost confirmation message.

2. The method according to claim 1, wherein the enabling the boost mode comprises:

obtaining, by the bidirectional DC-DC converter assembly, a current total voltage of the power battery pack as a target boost value, and enabling the boost mode with the target boost value, wherein a voltage value inputted by the storage battery to the vehicle load through the bidirectional DC-DC converter assembly is close to the target boost value.

3. The method according to claim 1, wherein the cutting off, by the battery controller, the electrical connection between the power battery pack and the high-voltage circuit of the vehicle in response to the boost confirmation message comprises:

disconnecting positive and negative discharge electrode contactors of the power battery pack, and disconnecting positive and negative electrode contactors of the high-voltage circuit of the vehicle.

4. The method according to claim 1, further comprising:

detecting, by the battery controller, a new power battery pack being connected to the vehicle;

closing, by the battery controller, positive and negative discharge electrode contactors of the new power battery pack, and feeding back a connection message to the VCU;

transmitting, by the VCU, the connection message to the bidirectional DC-DC converter assembly; and disabling, by the bidirectional DC-DC converter assembly, the boost mode and enabling the buck mode in response to the connection message.

5. The method according to claim 4, wherein the connection message comprises a total voltage of the new power battery pack, and the method further comprises, before the disabling, by the bidirectional DC-DC converter assembly, the boost mode and enabling the buck mode according to the connection message:

determining, by the bidirectional DC-DC converter assembly, the total voltage of the new power battery pack as a new target value;

adjusting, by the bidirectional DC-DC converter assembly, the boost mode with the new target value, wherein an input voltage inputted by the bidirectional DC-DC converter assembly to the vehicle load is close to the new target value.

6. The method according to claim 5, further comprising:

after adjusting the boost mode with the new target value, feeding back, by the bidirectional DC-DC converter assembly, a mode adjustment confirmation message to the VCU;

transmitting, by the VCU, the mode adjustment confirmation message to the battery controller; and closing, by the battery controller, the positive and negative electrode contactors of the high-voltage circuit in response to the mode adjustment confirmation message.

7. The method according to claim 4, further comprising: after the disabling, by the bidirectional DC-DC converter assembly, the boost mode and enabling the buck mode according to the connection message, feeding back, by the bidirectional DC-DC converter assembly, a battery swapping completion confirmation message to the VCU.

8. A system for controlling battery swapping of a vehicle, comprising a vehicle control unit (VCU), a bidirectional DC-DC converter assembly, a battery controller, a power battery pack, and a storage battery, the bidirectional DC-DC converter assembly having a buck mode and a boost mode; the bidirectional DC-DC converter assembly being in the buck mode when the vehicle is powered on, and the power battery pack being configured to supply power to a vehicle load of the vehicle and charge the storage battery through the bidirectional DC-DC converter assembly, wherein the VCU is configured to receive a battery swapping instruction when the vehicle is in a high-voltage power-on state, and to transmit a switching instruction to the bidirectional DC-DC converter assembly in response to the battery swapping instruction;

the bidirectional DC-DC converter assembly is configured to disable the buck mode and enable the boost mode in response to the switching instruction, and transmit a boost confirmation message to the battery controller through the VCU;

the battery controller is configured to cut off electrical connection between the power battery pack and a high-voltage circuit of the vehicle in response to the boost confirmation message; and the storage battery is configured to supply power to the vehicle load through the bidirectional DC-DC converter assembly.

9. A vehicle, comprising a system for controlling battery swapping of the vehicle, the vehicle comprising a vehicle control unit (VCU), a bidirectional DC-DC converter assembly, a power battery pack, and a storage battery, the bidirectional DC-DC converter assembly having a buck mode and a boost mode, the bidirectional DC-DC converter assembly being in the buck mode when the vehicle is in a high-voltage power-on state, the power battery pack being configured to supply power to a vehicle load of the vehicle and charge the storage battery through the bidirectional DC-DC converter assembly, and the vehicle being configured to perform operations comprising:

receiving, by the VCU, a battery swapping instruction when the vehicle is in the high-voltage power-on state;

transmitting, by the VCU, a switching instruction to the bidirectional DC-DC converter assembly in response to the battery swapping instruction;

disabling, by the bidirectional DC-DC converter assembly, the buck mode in response to the switching instruction to cut off electrical connection between the power battery pack and a high-voltage circuit of the vehicle by a battery controller, and enabling the boost mode in response to the switching instruction to supply power to the vehicle load by the storage battery through the bidirectional DC-DC converter assembly, transmitting, by the bidirectional DC-DC converter assembly, a boost confirmation message to the battery controller through the VCU; and cutting off, by the battery controller, the electrical connection between the power battery pack and the high-voltage circuit of the vehicle in response to the boost confirmation message.

10. The vehicle according to claim 9, wherein the enabling the boost mode comprises:

obtaining, by the bidirectional DC-DC converter assembly, a current total voltage of the power battery pack as a target boost value, and enabling the boost mode with the target boost value, wherein a voltage value inputted by the storage battery to the vehicle load through the bidirectional DC-DC converter assembly is close to the target boost value.

11. The vehicle according to claim 9, wherein the cutting off, by the battery controller, the electrical connection between the power battery pack and the high-voltage circuit of the vehicle in response to the boost confirmation message comprises:

disconnecting positive and negative discharge electrode contactors of the power battery pack, and disconnecting positive and negative electrode contactors of the high-voltage circuit of the vehicle.

12. The vehicle according to claim 9, wherein the operations further comprise:

detecting, by the battery controller, a new power battery pack being connected to the vehicle;

closing, by the battery controller, positive and negative discharge electrode contactors of the new power battery pack, and feeding back a connection message to the VCU;

transmitting, by the VCU, the connection message to the bidirectional DC-DC converter assembly; and disabling, by the bidirectional DC-DC converter assembly, the boost mode and enabling the buck mode in response to the connection message.

13. The vehicle according to claim 12, wherein the connection message comprises a total voltage of the new power battery pack, and the operations further comprise, before the disabling, by the bidirectional DC-DC converter assembly, the boost mode and enabling the buck mode according to the connection message:

determining, by the bidirectional DC-DC converter assembly, the total voltage of the new power battery pack as a new target value;

adjusting, by the bidirectional DC-DC converter assembly, the boost mode with the new target value, wherein an input voltage inputted by the bidirectional DC-DC converter assembly to the vehicle load is close to the new target value.

14. The vehicle according to claim 13, wherein the operations further comprise:

after adjusting the boost mode with the new target value, feeding back, by the bidirectional DC-DC converter assembly, a mode adjustment confirmation message to the VCU;

transmitting, by the VCU, the mode adjustment confirmation message to the battery controller; and closing, by the battery controller, the positive and negative electrode contactors of the high-voltage circuit in response to the mode adjustment confirmation message.

15. The vehicle according to claim 12, wherein the operations further comprise: after the disabling, by the bidirectional DC-DC converter assembly, the boost mode and enabling the buck mode according to the connection message, feeding back, by the bidirectional DC-DC converter assembly, a battery swapping completion confirmation message to the VCU.

\* \* \* \* \*